(12) United States Patent
Larouche et al.

(10) Patent No.: US 11,654,483 B2
(45) Date of Patent: May 23, 2023

(54) METHOD FOR FORMING HIGH QUALITY POWDER FOR AN ADDITIVE MANUFACTURING PROCESS

(71) Applicant: AP&C Advanced Powders & Coatings Inc., Boisbriand (CA)

(72) Inventors: Frederic Larouche, Saint-Colomban (CA); Matthieu Balmayer, Montreal (CA); Gabriel Dickson, Saint-Colomban (CA)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 16/842,159

(22) Filed: Apr. 7, 2020

(65) Prior Publication Data
US 2021/0308753 A1  Oct. 7, 2021

(51) Int. Cl.
| | | |
|---|---|---|
| B22F 9/14 | (2006.01) | |
| B22F 1/065 | (2022.01) | |
| B22F 1/142 | (2022.01) | |
| B33Y 70/00 | (2020.01) | |
| B22F 9/20 | (2006.01) | |

(52) U.S. Cl.
CPC ............... *B22F 9/14* (2013.01); *B22F 1/065* (2022.01); *B22F 1/142* (2022.01); *B33Y 70/00* (2014.12); *B22F 9/20* (2013.01); *B22F 2201/11* (2013.01); *B22F 2202/13* (2013.01); *B22F 2301/052* (2013.01); *B22F 2301/15* (2013.01); *B22F 2301/205* (2013.01); *B22F 2301/35* (2013.01); *B22F 2304/10* (2013.01)

(58) Field of Classification Search
CPC ............................ B22F 9/08–9/10; B22F 9/14
USPC .................................................. 75/346
See application file for complete search history.

(56) References Cited

U.S. PATENT DOCUMENTS

| | | | | |
|---|---|---|---|---|
| 3,989,512 A | * | 11/1976 | Sayce | B01J 15/00 219/121.36 |
| 5,144,110 A | * | 9/1992 | Marantz | H05H 1/42 219/121.48 |
| 7,572,315 B2 | | 8/2009 | Boulos et al. | |
| 2007/0084308 A1 | * | 4/2007 | Nakamura | B22F 9/14 75/346 |
| 2016/0045841 A1 | | 2/2016 | Kaplan et al. | |

(Continued)

FOREIGN PATENT DOCUMENTS

CN 108213451 A 6/2018

OTHER PUBLICATIONS

ISO, ISO. "9276-6 Representation of Results of Particle Size Analysis—Part 6: Descriptive and Quantitative Representation of Particle Shape and Morphology." ISO, Geneva (2008): 23. (Year: 2008).*

*Primary Examiner* — Anthony J Zimmer
*Assistant Examiner* — Sean P. O'Keefe
(74) *Attorney, Agent, or Firm* — Dority & Manning, P.A.

(57) ABSTRACT

A powder treatment assembly and method for treating a feedstock powder of feedstock particles includes directing the feedstock powder into a plasma chamber within a reactor, exposing the feedstock powder to a plasma field generated by a plasma source to form a treated powder having treated particles with an increased average sphericity relative to the feedstock particles, and supplying a hot gas sheath flow downstream of the plasma chamber, the hot gas sheath flow substantially surrounding the treated powder.

20 Claims, 10 Drawing Sheets

(56) References Cited

U.S. PATENT DOCUMENTS

| | | |
|---|---|---|
| 2016/0221084 A1 | 8/2016 | Klecka et al. |
| 2017/0029929 A1 | 2/2017 | Konyashin et al. |
| 2017/0173699 A1 | 6/2017 | Hadidi et al. |
| 2017/0320135 A1 | 11/2017 | She et al. |
| 2018/0104740 A1 | 4/2018 | Yamamoto et al. |
| 2018/0169763 A1* | 6/2018 | Dorval Dion ............. B29B 9/10 |
| 2018/0214956 A1* | 8/2018 | Larouche .............. C22C 1/0416 |
| 2018/0297122 A1 | 10/2018 | Hadidi et al. |
| 2019/0001416 A1 | 1/2019 | Larouche et al. |
| 2019/0232365 A1 | 8/2019 | Larouche et al. |
| 2019/0381564 A1 | 12/2019 | Barnes et al. |
| 2020/0078861 A1 | 3/2020 | Sungail et al. |
| 2020/0180034 A1* | 6/2020 | Dorval Dion ........... B22F 3/003 |

\* cited by examiner

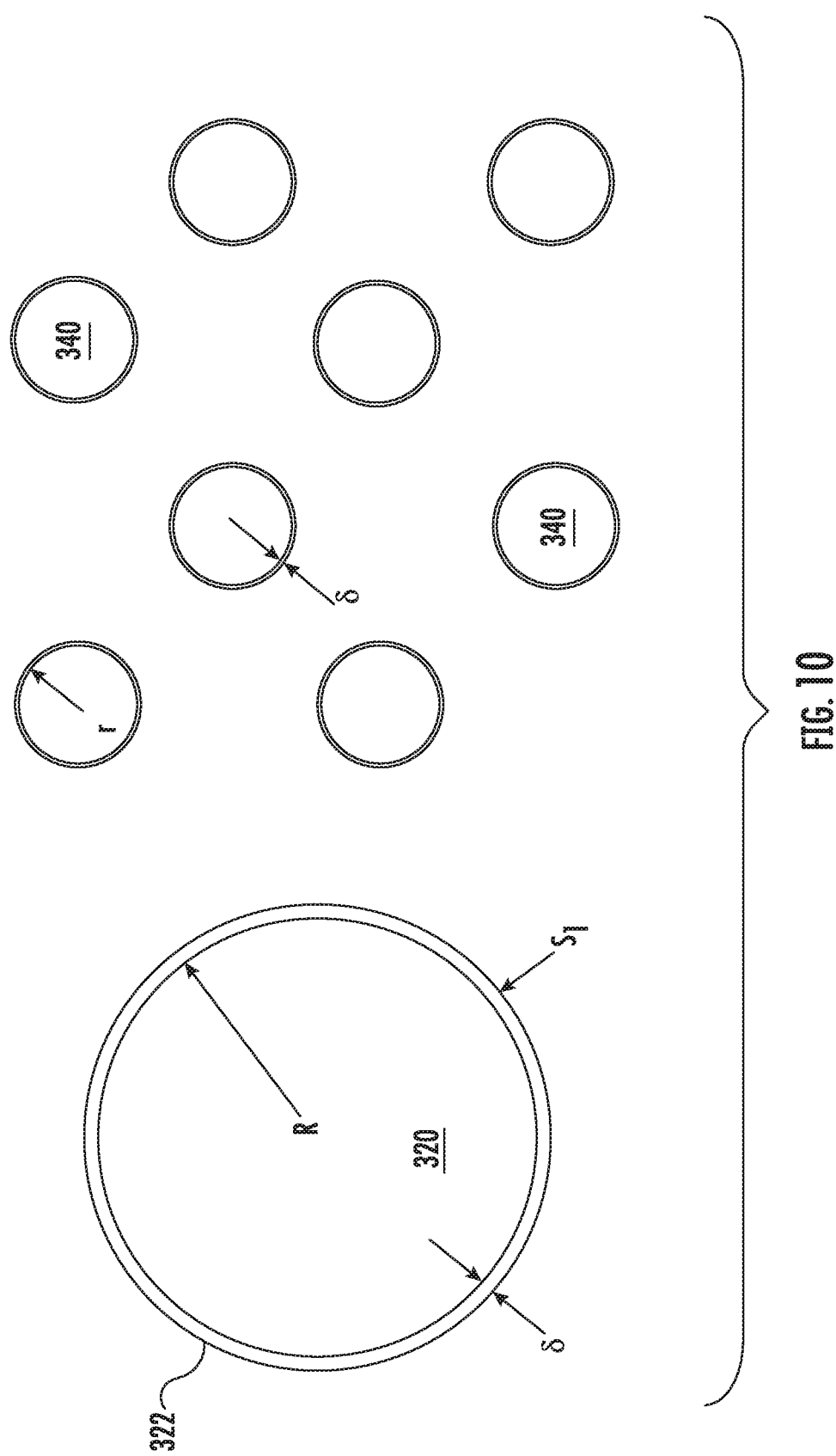

METHOD FOR FORMING HIGH QUALITY POWDER FOR AN ADDITIVE MANUFACTURING PROCESS

FIELD

The present disclosure generally relates to additive powders for use in additive manufacturing machines and processes, and more particularly to systems and methods for forming high quality spherical additive powders.

BACKGROUND

Additive manufacturing processes generally involve the buildup of one or more materials to make a net or near net shape (NNS) object, in contrast to subtractive manufacturing methods. Though "additive manufacturing" is an industry standard term, additive manufacturing encompasses various manufacturing and prototyping techniques known under a variety of additive manufacturing terms, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model.

One common type of powder bed additive manufacturing process, referred to as electron beam melting (EBM), produces three-dimensional (3D) objects by using an electron beam to sinter, melt, or otherwise fuse a fine powder. Laser sintering or melting is also a notable additive manufacturing process which uses a laser beam to selectively fuse various material systems, such as engineering plastics, thermoplastic elastomers, metals, ceramics, etc. During both EBM and laser sintering/melting processes, the powder to be melted is spread evenly over a powder bed on a build platform, and the energy beam sinters or melts a cross sectional layer of the object being built under control of an electronic control unit or an emission directing device. The build platform is lowered and another layer of powder is spread over the powder bed and object being built, followed by successive melting/sintering of the powder. The process is repeated until the part is completely built up from the melted/sintered powder material.

Regardless the type of powder bed additive manufacturing process, the physical and chemical characteristics of the additive powder can impact the quality of the resulting object. That is, the properties of a component built through additive manufacturing depends on the metal powder itself, with higher quality powders (e.g., denser, cleaner, and more spherical) behaving more predictably and thus resulting in better parts. As such, high quality powder material is required for components formed from additive manufacturing techniques, particularly when used to manufacture components for gas turbine machinery and/or medical implant or device applications.

For example, the flowability of additive powder is an important characteristic that greatly affects the printing process. Specifically, an additive powder that has poor flowability may have a tendency to agglomerate or stick together on surface of the powder dispenser, on the recoating mechanism, or on other surfaces of the additive manufacturing machine. In addition, it may be difficult or impossible to evenly spread a layer of additive powder which has poor flowability, resulting in voids in the powder that can produce corresponding voids or defects in the finished part.

Accordingly, additive powder for use with an additive manufacturing machine which has improved physical and chemical characteristics would be useful. More particularly, a method for treating additive powder to improve physical properties on a large scale would be particularly beneficial.

BRIEF DESCRIPTION

Aspects and advantages will be set forth in part in the following description, or may be obvious from the description, or may be learned through practice of the invention.

According to one embodiment of the present subject matter, a method of treating a feedstock powder of feedstock particles in a powder treatment assembly is provided. The method includes directing the feedstock powder into a plasma chamber within a reactor of the powder treatment assembly, exposing the feedstock powder to a plasma field generated by a plasma source to form a treated powder having treated particles with an increased average sphericity relative to the feedstock particles, and supplying a hot gas sheath flow downstream of the plasma chamber, the hot gas sheath flow substantially surrounding the treated powder.

According to another exemplary embodiment, a powder treatment assembly for treating a feedstock powder of feedstock particles is provided. The powder treatment assembly includes a reactor defining a plasma chamber, a feedstock supply for providing feedstock powder and a carrier gas into the plasma chamber, a plasma source for directing a plasma field into the plasma chamber to form a treated powder having treated particles with an increased average sphericity relative to the feedstock particles, and a sheath gas source for supplying a hot gas sheath flow downstream of the plasma chamber, the hot gas sheath flow substantially surrounding the treated powder.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 illustrates a schematic diagram of a particle having a radius R and a plurality of particles each having a radius r formed from the same mass of material.

Figure 1:
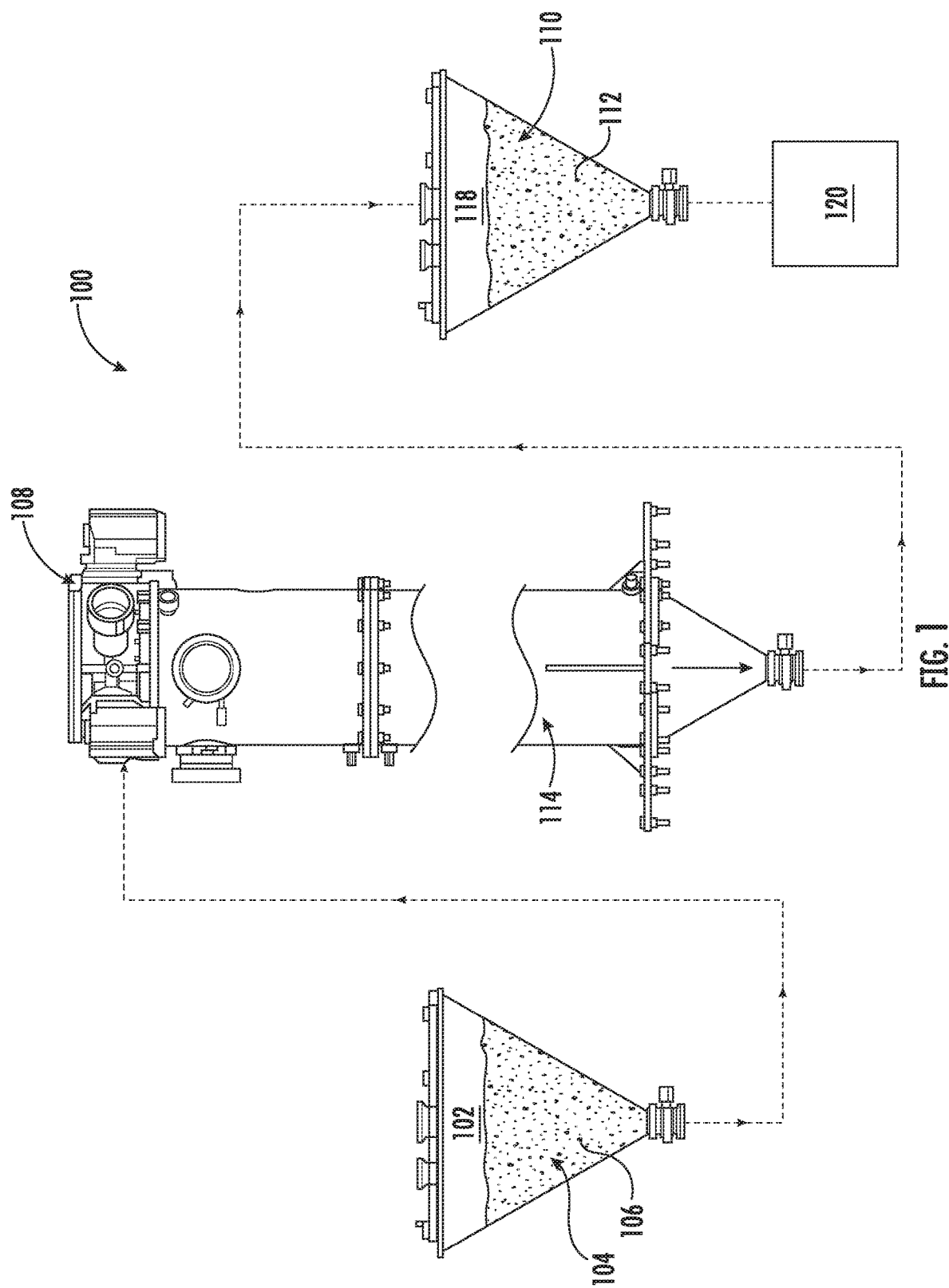
FIG. 1 shows a schematic view of a powder treatment assembly which may be used to treat additive powder according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to the motion of an object or a flow of fluid. For example, "upstream" refers to the direction from which the object has moved or fluid has flowed, and "downstream" refers to the direction to which the object is moving or the fluid is flowing. Furthermore, as used herein, terms of approximation, such as "approximately," "substantially," or "about," refer to being within a ten percent margin of error.

The present subject matter generally includes methods for creating higher quality powder materials (i.e., a treated powder) from a lower-quality powder source (i.e., a feedstock powder), along with apparatus to perform such methods and the resulting particles. In one embodiment, a powder treatment assembly and method for treating a feedstock powder of feedstock particles includes directing the feedstock powder into a plasma chamber within a reactor, exposing the feedstock powder to a plasma field generated by a plasma source to form a treated powder having treated particles with an increased average sphericity relative to the feedstock particles, and supplying a hot gas sheath flow downstream of the plasma chamber, the hot gas sheath flow substantially surrounding the treated powder. In one embodiment, treated particles of the treated powder may have a more spherical shape (i.e., increased sphericity) than the feedstock particles of the feedstock powder, which may be irregular, non-spherical in shape. Additionally, any oxidation layer present on the feedstock powder may be removed (e.g., through chemical reduction). In one embodiment, the treated powder may be substantially free from any oxidation layer on its surface. As used herein, the term "substantially free" means no more than an insignificant trace amount present and encompasses completely free (e.g., 0 molar % up to 0.01 molar %).

With reference to FIG. 1, a powder treatment assembly 100 includes a powder feeder 102 that is filled with raw powder to be treated, e.g., referred to herein as feedstock powder 104, which includes a plurality of feedstock particles 106. The powder feeder 102 is fluidly coupled to a reactor assembly 108 and feeds the feedstock powder 104 into the reactor assembly 108, where the feedstock powder 104 is treated to form treated powder 110 which includes a plurality of treated particles 112 having improved physical and chemical characteristics. Specifically, as will be described in more detail below according to exemplary embodiments, reactor assembly 108 includes plasma torches and/or gas heaters that generate heat or focus a hot gas into a zone of convergence with the feedstock powder 104 and a process gas. Once processed or treated with heat and process gas, the treated powders 110 are directed down into a reactor 114 which defines a reactor chamber 116 of the reactor assembly 108 to allow cooling before the treated powders 110 are accumulated and sent to a collection hopper 118 and a filtration system 120.

Figure 2:
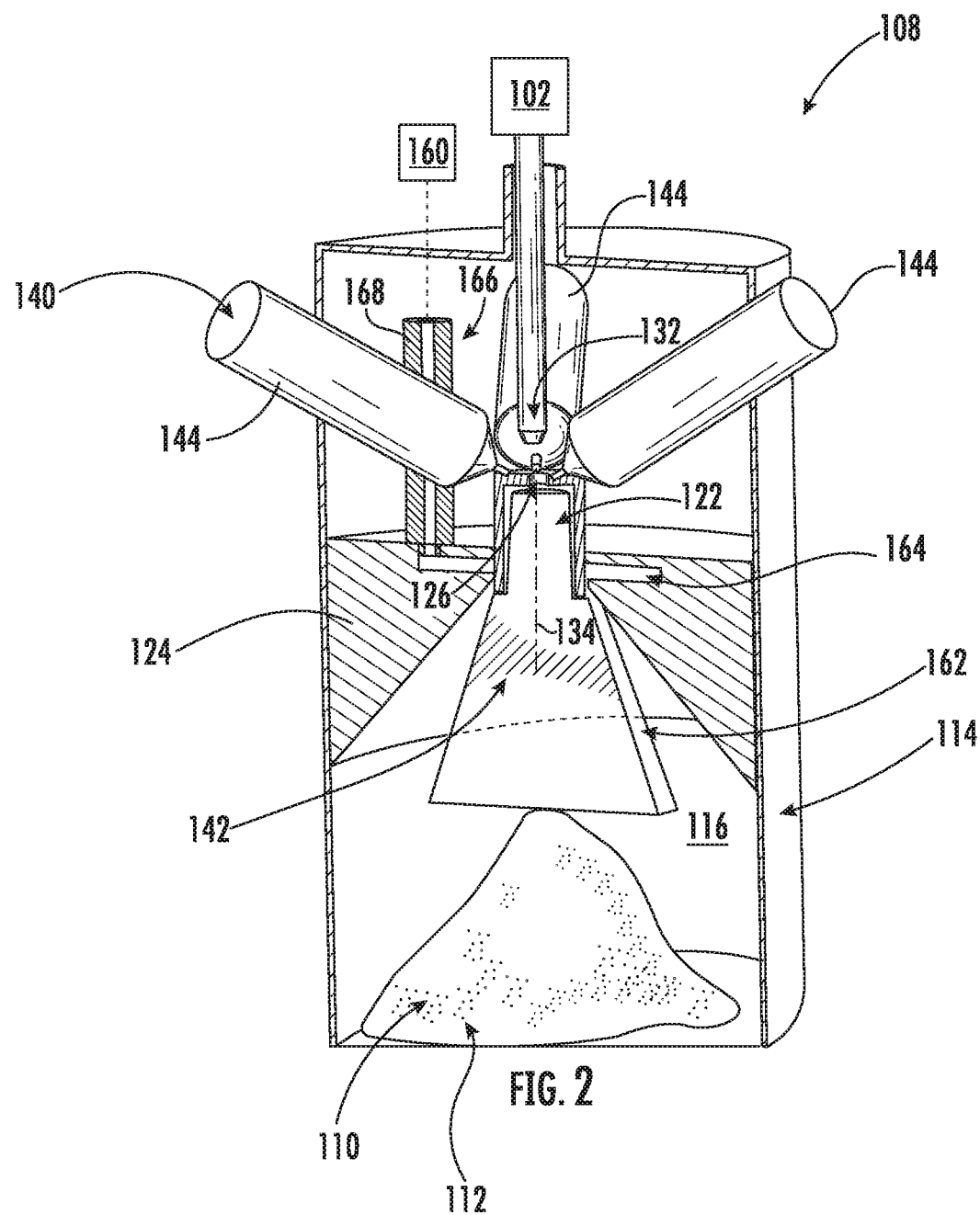
FIG. 2 shows a schematic view of a reactor assembly that may be used with the exemplary powder treatment assembly of FIG. 1 according to an exemplary embodiment of the present subject matter.
Figure 3:
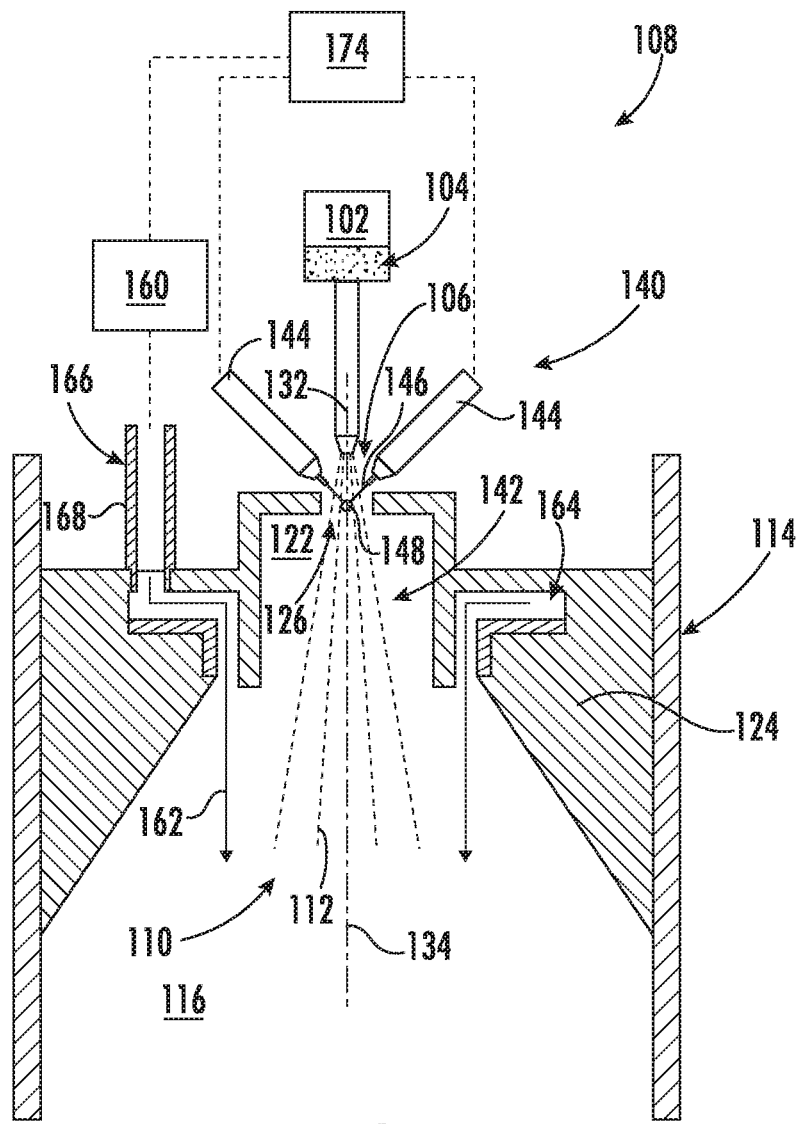
FIG. 3 shows another schematic view of the exemplary powder treatment assembly of FIG. 2 according to an exemplary embodiment of the present subject matter.

Referring now generally to FIGS. 2 and 3, a reactor assembly 108 for treating additive powder will be described according to an exemplary embodiment of the present subject matter. Specifically, as illustrated, reactor assembly 108 includes a vessel or reactor 114 for receiving a feedstock powder 104 which includes the plurality of feedstock particles 106. As explained herein, reactor assembly 108 and the associated methods of operation are generally intended to treat feedstock powder 104 to form a treated powder 110 which includes a plurality of treated particles 112 having improved physical and chemical characteristics or properties, e.g., such as improved sphericity, density, flowability, etc. When using such treated powder 110 as additive powder for an additive manufacturing process, the printing process may be improved and defects in the printed parts may be reduced.

As illustrated, reactor assembly 108 includes reactor 114 which defines a reactor chamber 116 which generally provides a contaminant free environment for treating feedstock powder 104 and collecting treated powder 110. Reactor chamber 116 may have any suitable size or shape for treating any suitable type or quantity of feedstock powder 104. In addition, reactor assembly 108 may include an evacuation subsystem (not shown) which is fluidly coupled to reactor chamber 116 for selectively evacuating gases or other contaminants from reactor chamber 116. For example, the evacuation subsystem may include one or both of a gas inlet and a gas outlet which may be used to generate a vacuum within reactor chamber 116, may supply a purge gas into reactor chamber 116, or may otherwise maintain a desirable chamber environment for facilitating the treatment of feedstock powder 104 and/or storage of treated powder 110.

A plasma chamber 122 may be positioned within or defined by reactor 114 for facilitating a spheroidization process of feedstock powder 104, as described in more detail below. Specifically, according to the illustrated embodiment, reactor assembly 108 includes a central body 124 positioned within reactor chamber 116. Central body 124 defines plasma chamber 122 within a center of reactor chamber 116 and may further define chamber inlet 126 on a top wall of plasma chamber 122. According to an exemplary embodiment, central body 124 may be formed from graphite, e.g., as opposed to a ceramic material, though any suitable material may be used according to alternative embodiments.

As explained above, powder treatment assembly 100 may further include a powder feeder 102 which may supply a flow of feedstock powder 104 into plasma chamber 122. According to the illustrated embodiment, powder feeder 102 includes a feedstock discharge nozzle 132 for directing the flow of feedstock powder 104 along a flow direction (e.g., indicated by dotted line 134 in the figures). In this regard, feedstock discharge nozzle 132 is configured for directing the flow of feedstock powder 104 directly through chamber inlet 126 and into plasma chamber 122. According to the illustrated embodiment, the flow direction 134 of feedstock powder 104 is substantially parallel to the vertical direction, though other orientations, discharge apparatuses, nozzles, etc. are possible and within the scope of the present subject matter.

Although powder feeder 102 is described herein as providing a flow of feedstock powder 104, it should be appreciated that powder feeder 102 could also provide a carrier gas, multiple distinct flows of powder, or may have other distinct features for facilitating the flow of feedstock powder 104 and the plasma spheroidization process as described herein. For example, the carrier gas may be mixed with feedstock powder 104 or may be drawn in through chamber inlet 126 from around feedstock discharge nozzle 132. In general, the carrier gas may be an inert gas that improves the flow of feedstock powder 104 without affecting the spheroidization process or otherwise negatively affecting the spheroidization process.

In one embodiment, the carrier gas (i.e., the plasma gas) includes a reducing gas, such as hydrogen, carbon monoxide, or a mixture thereof. The reducing gas may react with any oxide layer on the surface of feedstock particles 106, which may be in the form of chromium oxide, iron oxide, etc. Such a reducing gas may react with the oxide to remove it from the surface such that the resulting treated powder 110 (in the form of a plurality of the resulting treated particles 112) are substantially free from any oxide layer thereon. Thus, in one particular embodiment, the reducing component reduces any oxide layer on the surface of feedstock particles 106 such that the resulting treated particles 112 are substantially free from any oxide layer thereon.

Reactor assembly 108 may further include a plasma source 140 for directing a plasma field (identified generally by reference numeral 142) into plasma chamber 122 to form treated powder 110 from feedstock powder 104. Specifically, according to an exemplary embodiment, the process is exposing feedstock powder 104 to plasma field 142 causes at least a portion of a surface of feedstock particles 106 melt or evaporate to increase the sphericity of feedstock particles 106.

Specifically, as illustrated, plasma source 140 includes a plurality of plasma torches 144, e.g., such as three plasma torches 144 directed toward plasma chamber 122. More specifically, each of the plurality of plasma torches 144 may generate a plasma jet 146 directed at an angle relative to flow direction 134 to converge at a focal point 148 (FIG. 3) below feedstock discharge nozzle 132. For example, as illustrated, focal point 148 of plasma jets 146 may be located at chamber inlet 126 of plasma chamber 122. In this manner, the flow of feedstock powder 104 and plasma jets 146 may interact upon entry into plasma chamber 122.

During operation of reactor assembly 108, feedstock powder 104 may be subjected to (e.g., exposed to) plasma spheroidization to produce the high quality powder, e.g., treated powder 110, within plasma chamber 122. Specifically, feedstock powder 104 (including feedstock particles 106) are generally introduced into a plasma chamber 122, along with a working gas or carrier gas (not shown, also referred to as the plasma gas, no matter its state of matter). Plasma field 142 may be formed within the plasma chamber 122 through heating (e.g., via plasma jets 146) to a temperature sufficient to convert the carrier gas from its gaseous state into its plasma state.

Generally, the feedstock powder 104 may be any metal material. In one embodiment, the metal material may include, but is not limited to, pure metals, iron alloys, titanium alloys, aluminum alloys, nickel alloys, chrome alloys, nickel-based superalloys, cobalt-based superalloys, iron-based superalloys, or mixtures thereof. In particular embodiments, alloying elements may be mixed with the feedstock powder 104 prior to or during exposure to the plasma field 142. As such, the chemical composition of the resulting treated powder 110 may be controlled. For example, in one particular embodiment, carbon particles may be mixed with feedstock particles 106 within plasma field 142.

Notably, feedstock particles 106 may have an irregular shape (e.g., non-spherical) when introduced into the plasma chamber 122. As feedstock powder 104 is passed through plasma field 142 that includes the carrier gas in its plasma state, the surface of feedstock particles 106 melts or evaporates within a melting zone (not shown) that includes the plasma field 142. However, without wishing to be bound by any particular theory, it is believed that feedstock particles 106 do not entirely melt and/or evaporate, but rather that the surfaces of feedstock particles 106 are melted/softened so as to reshape into a more regular shape (e.g., more spherical) while having a smaller size. Thus, at least a portion of the surfaces of feedstock particles 106 are melted/softened within the melting zone or within plasma field 122.

As used herein, the term "sphericity" is generally intended to refer to a measure of the spherical shape of powder. Specifically, the sphericity of a particle may be of value between zero and one, with a perfect sphere having a sphericity value of 1. According to exemplary embodiments, sphericity may be defined using any suitable standard, such as ISO 9276-6:2008 table 8.2. According to this standard, sphericity, also referred to as circularity (C), may be calculated using the equation below, wherein A is the area and p is the perimeter of a particle of powder:

$$C = \sqrt{\frac{4 \cdot \pi \cdot A}{p^2}}$$

According to one exemplary embodiment, the average sphericity of treated particles is between about 0.7 and 1, between about 0.8 and 1, or between about 0.85 and 0.99, or about 0.9. It should be appreciated that as used herein, sphericity or "average sphericity" may refer to a statistical average sphericity of particles within a volume of powder, such as a sample of treated particles 112. Any suitable of measuring average sphericity may be used while remaining within the scope of the present subject matter. In one embodiment, the resulting treated particles 112 have an average sphericity ratio relative to feedstock particles 106 of greater than 1.5:1, greater than 2:1, greater than 3:1, or greater than 5:1.

In certain embodiments, feedstock particles 106 have a maximum size of about 150 micrometers (μm). For example, feedstock particles 106 may have an average size of about 10

μm to about 150 μm (e.g., about 50 μm to about 100 μm). Through this plasma spheroidization process, the size of feedstock particles 106 may be decreased such that the resulting treated particles 112 have an average particle size that is less than an average particle size of feedstock particles 106. In one embodiment, the resulting treated particles 112 have an average particle size that is about 10% to about 90% of the average particle size of feedstock particles 106. In certain embodiments, the treated particles 112 have a maximum size of about 150 μm (e.g., an average size of about 10 μm to about 150 μm). In particular embodiments, the treated particles 112 have a maximum size of about 50 μm (e.g., an average size of about 10 μm to about 50 μm).

Notably, it may be desirable to include a flow of sheath gas within reactor chamber 116 to facilitate the spheroidization process. For example, reactor assembly 108 may include a sheath gas source 160 for supplying a hot gas sheath flow 162 downstream of plasma chamber 122. Specifically, according to the illustrated embodiment, hot gas sheath flow 162 substantially surrounds treated powder 110 exiting plasma chamber 122, e.g., to prevent immediate contact with reactor walls, to control the cooling rate of treated particles 112, and to prevent the agglomeration or merging of treated particles 112 prior to fully solidifying.

Specifically, according to the illustrated embodiment, central body 124 may define a distribution chamber 164 which encircles or surrounds plasma chamber 122. In this regard, the hot gas sheath flow 162 may surround plasma chamber 122 before being directed downward in a direction parallel to the feedstock flow direction 134. In this manner, for example, hot gas sheath flow 162 may be substantially cylindrical and may surround treated powder 110 exiting plasma chamber 122. According to an exemplary embodiment, hot gas sheath flow 162 includes Argon, another suitable inert gas, or any other suitable gas mixture which facilitates the spheroidization process.

Reactor assembly 108 may further include one or more heating assemblies 166 which are generally configured for raising the temperature of hot gas sheath flow 162 prior to interaction with treated powder 110. Specifically, as illustrated in FIG. 2, heating assemblies 166 includes an induction heating element 168 wrapped around a supply conduit of sheath gas that extends between sheath gas source 160 and distribution chamber 164. According to alternative embodiments, heating element 140 may include any other suitable alternative heating element, such as one or more gas burners, electrical resistance heating elements, plasma torches, hot gas supply systems, or any other suitable device or system of devices for heating the hot gas sheath flow 162.

As shown in FIG. 3, reactor assembly 108 may further include any suitable processor or controller for regulating operation of reactor assembly 108. Specifically, as illustrated, reactor assembly 108 further includes a controller 174 which is operably coupled with powder feeder 102, plasma source 140, sheath gas source 160, and other components of a reactor assembly 108. Controller 174 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 174 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 4:
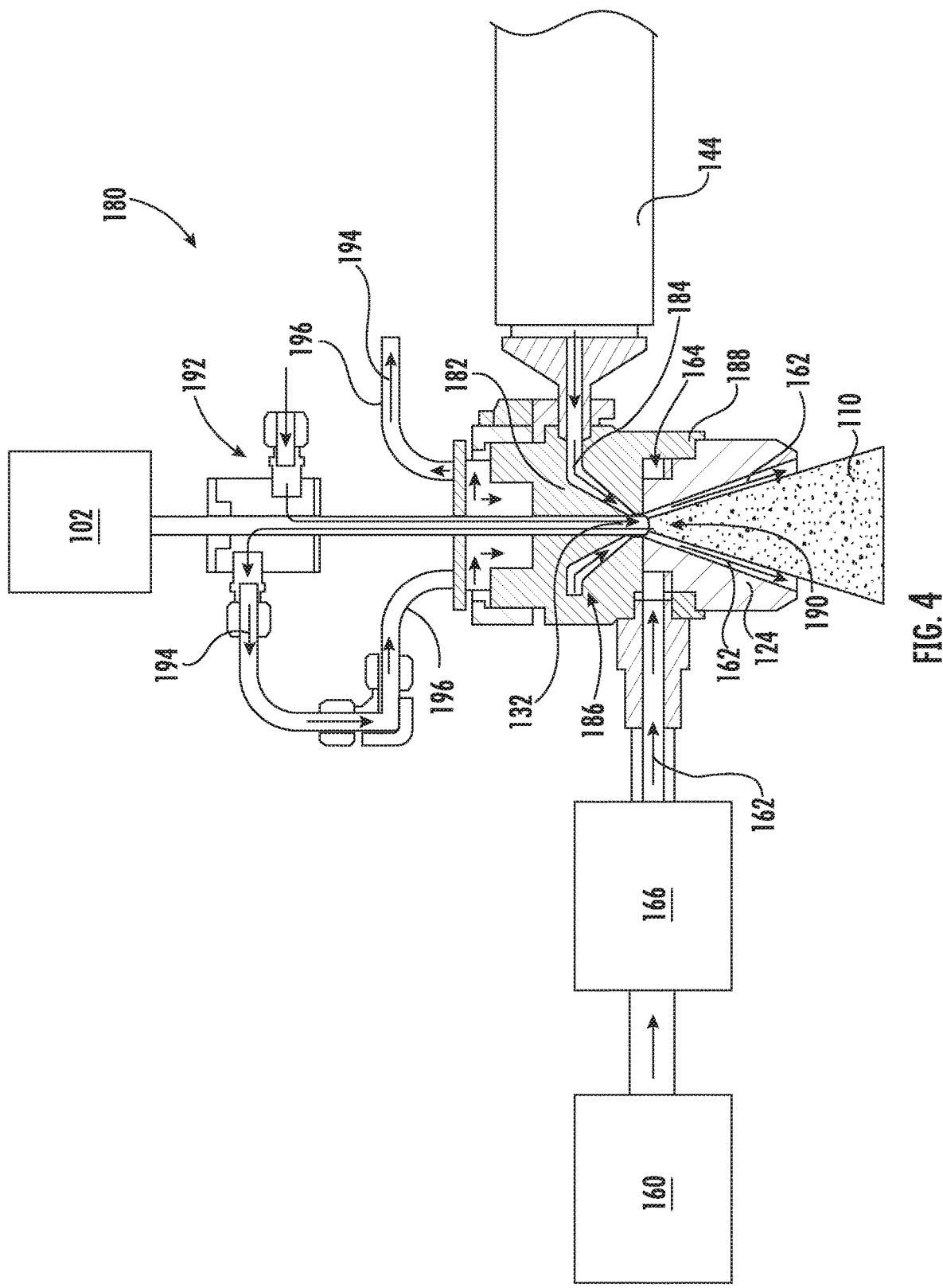
FIG. 4 shows a schematic view of a reactor assembly that may be used with the exemplary powder treatment assembly of FIG. 1, including detail on the heating unit by plasma torch or by heater gas for powder processing with views on the various flows of hot gas, sheath gas, powder and cooling paths.
Figure 5:
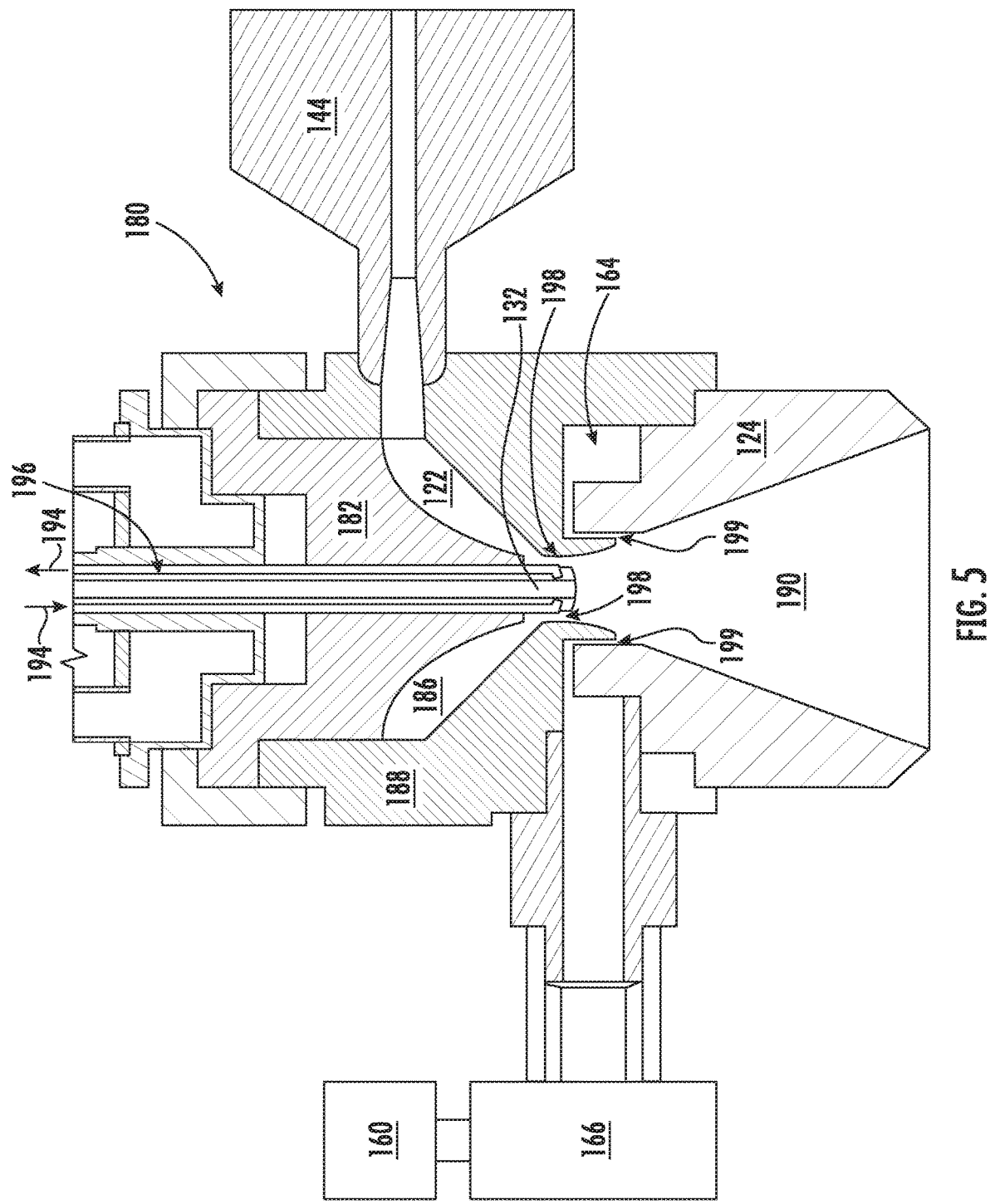
FIG. 5 shows a close-up schematic view of the process hot gas converging zone of the exemplary reactor assembly of FIG. 4.
Figure 6:
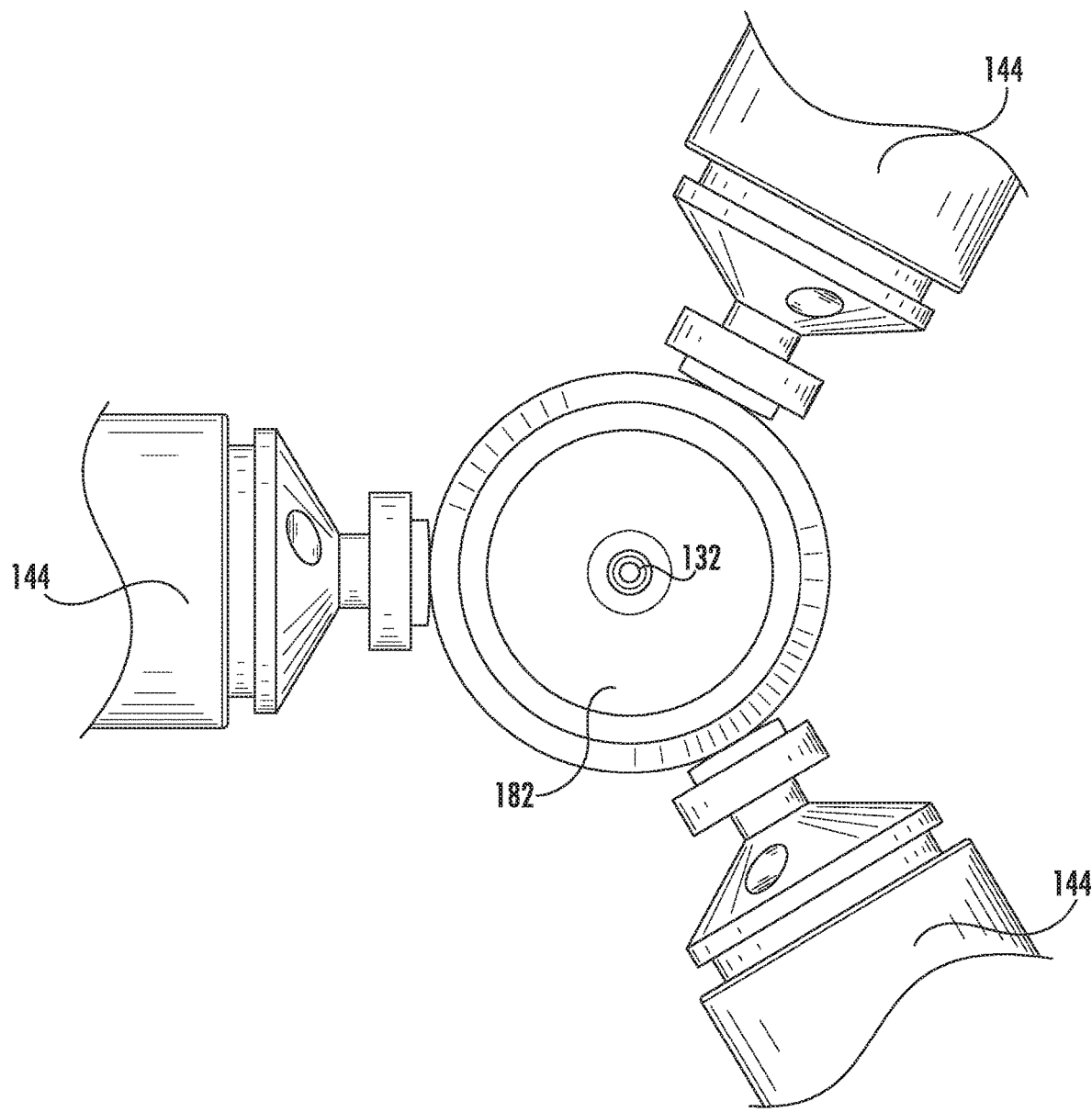
FIG. 6 provides an elevation view of the exemplary reactor assembly of FIG. 4, illustrating the decoupling of plasma torches or heater gases for heat generation in the powder processing process.

Referring now to FIGS. 4 through 6, a reactor assembly 180 that may be used with powder treatment assembly 100 according to another exemplary embodiments will be described. Notably, it should be appreciated that reactor assemblies 108, 180 may be the same or similar in many respects, aspects of each reactor assembly may be interchanged with each other, and other variations and modifications may be made to reactor assemblies 108, 180 while remaining within the scope of the present subject matter. Due to such similarities, in referring to FIGS. 4 through 6, like reference numerals may be used to describe the same or similar features as explained within respect to FIGS. 1 through 3.

FIG. 4 presents the heating unit or reactor assembly 180 that has a main body 182 in which there is the supply of one or more plasma torches or gas heaters 144 which heat an inert gas (e.g., such as argon, helium, etc., identified generally by reference numeral 184) to high temperature. For example, according to exemplary embodiments, plasma torches 144 heat the inert gas to more than 1300° C. depending on the specific treatment to be carried out on the feedstock powder 104. The hot gas 184 is accelerated into a conical deflection chamber 186 formed by main body 182 and an outer body 188, which may both be conical parts. In this manner, reactor assembly 180 defines a plasma chamber 122 (which includes conical deflection chamber 186) for receiving hot gas 184 that is directed into a powder injection area 190.

The feedstock powder 104 is transported by a carrier gas into the system and is injected through a water-cooled injection nozzle 132 to avoid sintering of the feedstock powder 104 into the injection nozzle 132 due to high temperatures. According to an exemplary embodiment, the tip of injection nozzle 132 is adjustable in vertical position to allow the injection of the feedstock powder 104 in the center of the heated gas or plasma chamber 122. A sheath gas flow 162 (inert laminar gas flow), which may be heated with a heating assembly 166, prevents treated powder 110 from agglomeration on the outer wall of reactor 114 of the heated zone. According to exemplary embodiments, heating assembly 166 may include a plasma torch 144 or any other suitable heating system for heating hot gas sheath flow 162 to any suitable temperature, e.g., such as temperatures of more than 1000° C. The lower part of central body 124 and reactor 114 allows the treated powder 110 to have a sufficient residence time, e.g., such as more than 3 ms, at a temperature of more than 1000° C. depending on the type of powder, to melt and/or chemical reaction required.

As best shown in FIGS. 4 and 5, reactor assembly 180 may further include a cooling system 192 for providing water or another suitable cooling fluid (indicated by arrows 194 in FIG. 4) throughout temperature sensitive or high temperature regions of reactor assembly 180 for maintaining temperatures within a desired range. Cooling system 192 includes cooling water paths 196 to circulate cooling fluid 194 to the tip of injection nozzle 132, through main body 182, around the walls of plasma chamber 122, or to any other sections of reactor assembly 180 where temperature regulation is desirable. When treated, the treated powder 110 is discharged to the reactor chamber 116 of reactor 114. According to exemplary embodiments, reactor assembly 180 may be surrounded by heat cooling or insulation, e.g., on the outer surface of the reactor parts. These features may transfer heat by conduction, convection, or radiation to ensure optimal efficiency without destroying the reactor material by evaporation.

The key areas of the reactor assembly 180 are presented in FIG. 5 in which one has the conical deflection chamber 186 of the hot gas 184 generated by plasma torches 144 or gas heaters which is directed to a restriction ring 198 (e.g., part of plasma chamber 122) that forms a restriction in plasma chamber 122 and urges the hot gas 184 into the powder injection area 190. Injection of feedstock powder 104 and treatment gas is done through the tip of the cooled injection nozzle 132. This injection nozzle 132 can be adjusted in height (e.g., via a height adjustment assembly or threaded connection) to release the feedstock powder 104 to the right location of the powder injection area 190. Heated sheath gas 162 is passed through a cylindrical distribution chamber 164 (e.g., from a sheath gas source 160) and is introduced through a cylindrical orifice 199 under the powder injection area 190. This sheath gas 162 prevents powder agglomeration on the lower wall of reactor 114 and maintains an adequate temperature of residence of the treated powder 110 in the reactor chamber 116. According to exemplary embodiments, the hot gas sheath flow 162 is symmetrical, laminar, and at high velocity.

FIG. 6. illustrates and exemplary way to pair multiple plasma torches 144 or gas heaters to the outer body 188 of reactor assembly 180 can cause plasma chamber 122 to reach temperatures in the order of more than 2000° C. Each plasma torch 144 can be operably coupled to conical deflection chamber 186 and can reach a power of hundreds of kW or gas heaters can reach a temperature of more than 1500° C. The injection of the feedstock powder 104 and the treatment gas is done through the center of powder injection area 190 and the inlet, e.g., cylindrical orifice 199, of the sheath gas 162 is done through an inlet into the side of central body 124 and outer body 188. Once processed by reactor assembly 180, the treated powder 110 may have the appropriate characteristics for use in additive manufacturing processes.

Now that the construction and configuration of reactor assemblies 108, 180 have been described according to exemplary embodiments of the present subject matter, an exemplary method 200 for operating a powder treatment assembly will be described according to an exemplary embodiment of the present subject matter. Method 200 can be used to operate reactor assemblies 108, 180, or any other suitable powder treatment assembly. In this regard, for example, controller 174 may be configured for implementing some or all steps of method 200. Further, it should be appreciated that the exemplary method 200 is discussed herein only to describe exemplary aspects of the present subject matter, and is not intended to be limiting.

Figure 7:
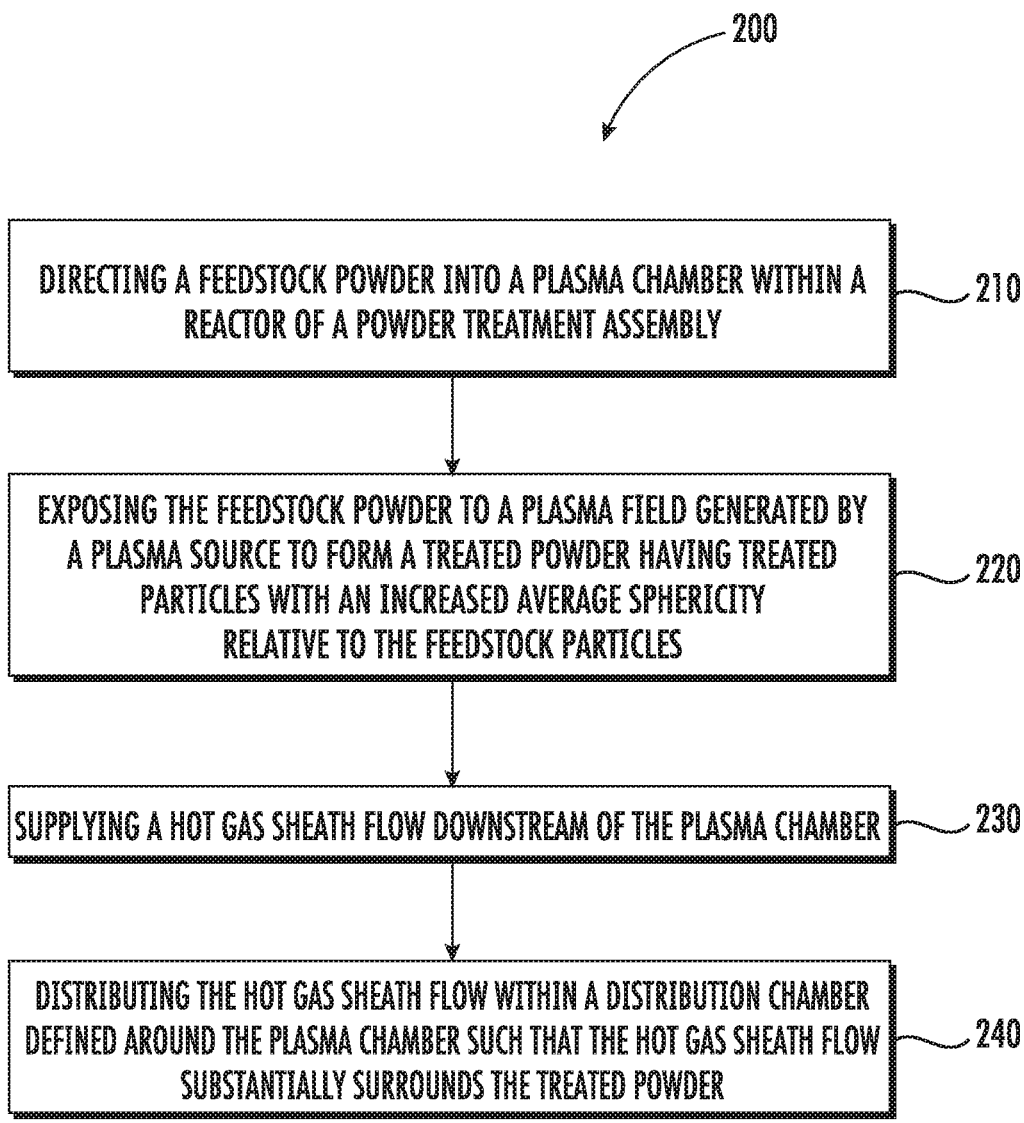
FIG. 7 is a method of treating additive powder using a powder treatment assembly according to an exemplary embodiment of the present subject matter.

Referring now to FIG. 7, method 200 includes, at step 210, directing a feedstock powder into a plasma chamber within a reactor of a powder treatment assembly. Step 220 includes exposing the feedstock powder to a plasma field generated by plasma source to form a treated powder having treated particles with an increased average sphericity relative to the feedstock particles. For example, as described above, feedstock powder 104 may be discharged along with the carrier gas into plasma chamber 122 before being treated to reduce particle size, increase sphericity, or otherwise modify the physical or chemical characteristics of feedstock powder 104.

Method 200 further includes, at step 230, supplying hot gas sheath flow downstream of the plasma chamber. Step 240 may include distributing the hot gas sheath flow within the distribution chamber defined around the plasma chamber such that the hot gas sheath flow substantially surrounds the treated powder. In this regard, as illustrated and described above, hot gas sheath flow 162 may include argon and may have a substantially cylindrical shape that surrounds treated powder 110 exiting plasma chamber 122 to facilitate an improved spheroidization process.

FIG. 7 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using reactor assembly 108 as an example, it should be appreciated that these methods may be applied to the operation of any suitable powder treatment assembly for treating any material, chemical composition, powder, etc.

It will be appreciated that processing powder in accordance with one or more of the exemplary embodiments and aspects described hereinabove may result in a powder (e.g., treated powder 110) formed of particles (e.g., treated particles 112) having characteristics to increase a flowability of such powder. For example, reference will now be made to FIGS. 8 through 10, explaining aspects of one or more particles of a powder processed in accordance with one or more of the exemplary embodiments and aspects described hereinabove.

Figure 8:
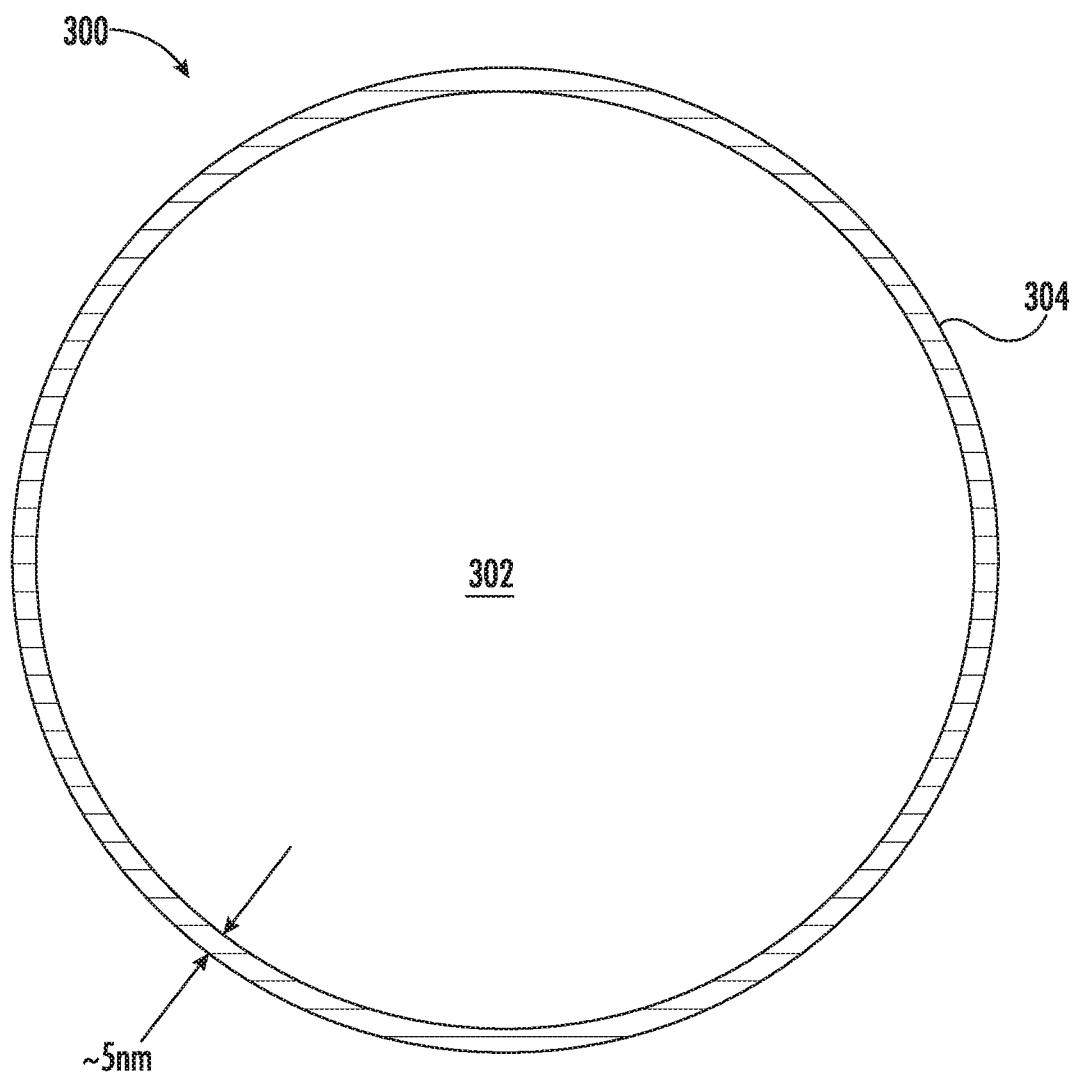
FIG. 8 is a schematic diagram of a particle of reactive metal powder processed without exposure to an additive gas.

First by way of background comparison, FIG. 8 illustrates a schematic diagram of a particle 300 of reactive metal powder formed according to an atomization processes in which the heated metal source is not contacted with an additive gas (which is referred to elsewhere herein as a reactive gas). The formed particle 300 generally includes a particle body 302 (for example a Ti-6Al-4V particle) and a surface native oxide layer 304. The surface native oxide layer 304 has a generally negative charge, which gives the formed particle 300 a net non-zero charge (i.e., for particle 302, Qnet≠0). Such negative charge may give the particle 300 a greater ability to polarize. The particle 302 may also include hydroxyl groups at the surface 304.

Figure 9:
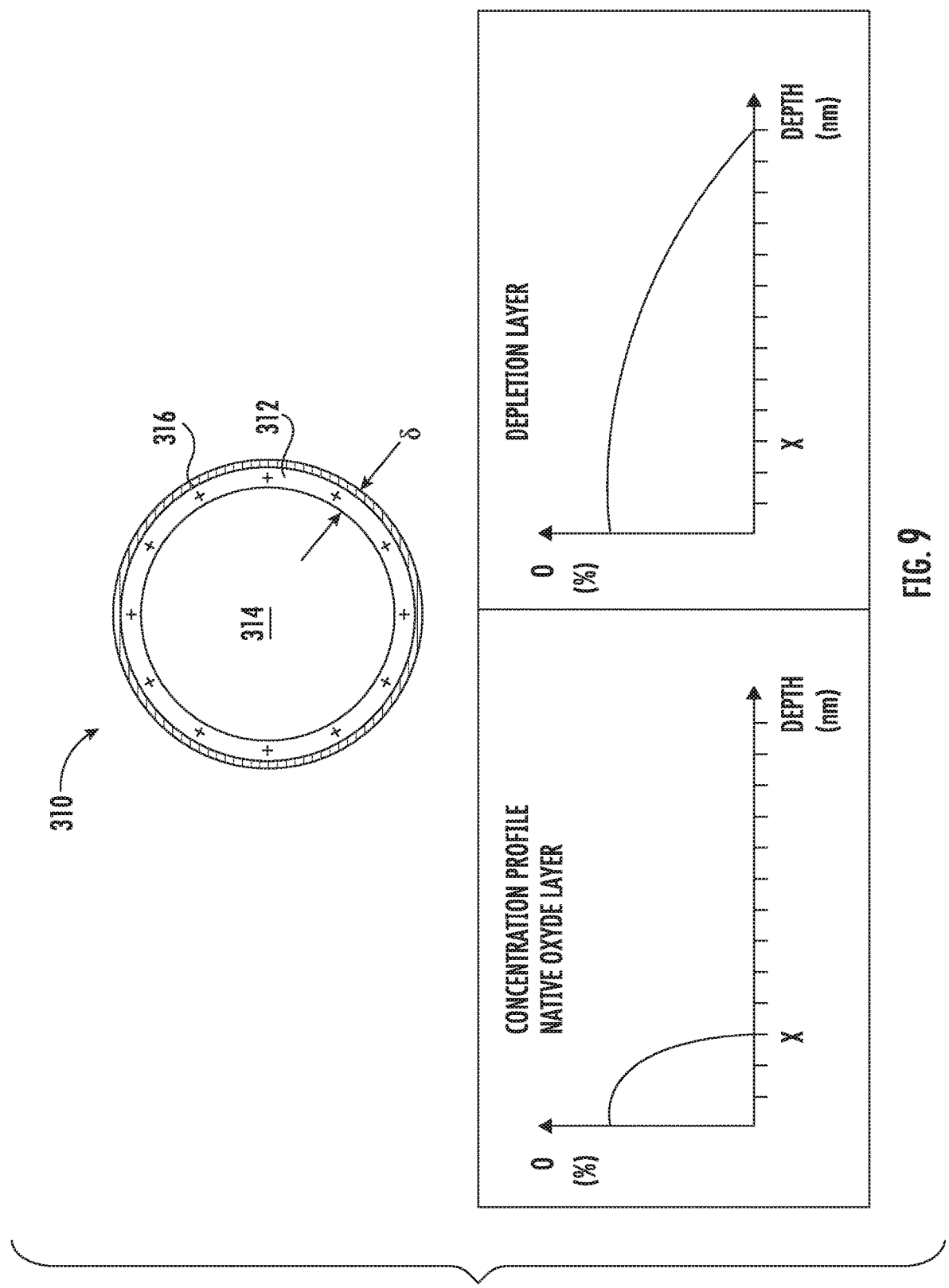
FIG. 9 is a schematic diagram of a particle of reactive metal powder processed according to one or more exemplary embodiment or aspects described herein.

By contrast, referring now to FIG. 9, a schematic diagram of a particle 310 of reactive metal powder processed in accordance with one or more of the exemplary embodiment and aspects described herein above in which a heated metal source or baseline powder is contacted with an additive gas. A first layer 312 (or layer 1) is formed on the outer surface of the particle body 314 (for example a Ti-6Al-4V particle). It results from the compounding of the baseline powder with the electronegative atoms and/or molecules that are depleting through the thickness. A second layer 316 (or layer 2) being a native oxide layer is further formed on the surface of the particle body 314. The first layer 312 and the second layer 316 may have a combined charge that is substantially neutral, thereby causing the formed particle 310 to have a substantially net zero charge (Qnet≈0) and a lower ability to polarize.

Following the theory that the electronegative atoms and/or molecules from the additive gas become a surface additive on the particles of the raw metal powder processed, the amount of additive gas injected during the processing steps described herein may be controlled as it varies quasi linearly with the processing rate of metal powder having a predetermined particle size distribution. The amount of additive gas needed to form the layer 1 is related to the total surface area of the metal particles which depends of the production rate and particle size distributions (see FIG. 10). The concentration of the additive gas and the thermal conditions of the metal particles will determine the depleting layer depth of the layer 1.

Further following the theory that the electronegative atoms and/or molecules from the additive gas become a surface additive on particles of the raw metal powder formed, the amount of additive gas injected during the processing steps described herein may be controlled as it varies with the total area of the particles of the metal powder formed as shown in FIG. 10.

Further following the theory that the electronegative atoms and/or molecules from the additive gas become a surface additive on particles of the raw metal powder formed, the amount of additive gas injected during the processing steps may be controlled as it varies with the temperature of the surface of the particles of the raw metal powder formed. The reaction rate $\Phi$ of such chemical reaction of activation energy E generally follows an Arhenius relation with the temperature T:

$$\Phi \propto e^{-E/kT}$$

The injection of the additive gas at high temperature may thus be more efficient and may require less additive gas concentration to generate a desired depletion depth and form the layer 1.

FIG. 10 illustrates a schematic diagram of a particle 320 having a radius R and a depletion depth of $\delta$ at the surface 322 of the particle 320. The total surface area of the particle is $S1=4\pi R2$.

FIG. 10 further illustrates a schematic diagram of a plurality of particles (n particles) 340 of the same size having the same total mass as the mass of the particle 320. The particles 340 are smaller in size than particle 320 but they have a larger surface area in total than particle 320. each particle 340 having a radius r and the total number of particles being $n=R3/r3$. The combined surface area of the particles 340 is $S2=n4\pi r2=R/rS1$. It increases linearly with decreasing radius of particles.

The amount of surface additive added is thus a function of the total surface area as the volume that will be treated is the product of the total surface area by the depletion depth.

For example, the obtained metal powders can have less than about 100 150, 200, 300, 500, 1000 or 1500 ppm of an electronegative atom and/or molecule (for example an electronegative atom and/or molecule element that is comprised within the additive gas used to produce the powder).

In sum, the powder treatment assembly and methods of operation described herein facilitate the spheroidization of additive powders. The method includes injecting a powder transported by a carrier gas within a plasma flow. The plasma flow may be generated by the injection of one or many plasma jets from plasma torches, such as DC, radiofrequency, microwave, or 3 phases AC arc torches. The gas used in the plasma torches is generally inert but could also contain non-inert gas. The plasma flow and powder mixture is then sheathed by a hot gas sheath flow.

The plasma and hot sheath gas mix together to form a high temperature medium that has sufficient residence time to melt the vast majority of the particles from the powder injected. The residence time may be determined by the power of the plasma torches, heat losses in the hot zone, the temperature of the sheath gas, and the amount of gas and powder injected in the process. The sheath gas is heated by a gas heater or a plasma torch and is injected at high velocity to efficiently confine the powder injected in the plasma flow, e.g., to prevent contact with the chamber walls prior to solidification.

Notably, aspects of the present subject matter are directed toward the use of a very high temperature gas heater which may be used to heat the sheath gas to a very high temperature. The use of such gas heater may even replace a plasma torch. Moreover, this heating process may be more efficient as the sheath gas is heated by a very efficient gas heater and is scalable, with heating power as high as several megawatts or higher. Spheroidization within RF torches has constraints on the system geometry, gas composition (e.g., use of Argon and high power difficult), power, and efficiency.

Moreover, the system and methods described herein facilitate powder treatment on a large scale to modify the surface chemistry or otherwise treat the additive powder to improve sphericity and obtain enhanced flowability, e.g., a measure of the additive powders ability to act like a liquid, minimize clumping or agglomeration, and/or to modify secondary electron emissions from the additive powder. By treating the additive powder ex-situ prior to use in an additive manufacturing machine, powders may be treated at large scale and low cost.

The system and process described herein achieves improved efficiency and scalability by decoupling various operating parameters, such as the total process power, flow geometry, the gas composition used, and other aspects of the treatment process. Moreover, there is no obligation to use a ceramic reactor or a reactor lining which is transparent to electromagnetic radiation. The process is also more versatile because the residence time may be more easily maintained and adjusted by having independent control of the flow rate and temperature of the hot gas sheath flow, the flow rate of the gas carrier and additive powder, the power input to the plasma source, etc.

The spheroidization system and associated methods described herein may provide various technical and commercial advantages. For example, the system may operate at high efficiency and scaling potential, both in quantity of powder and temperature/power levels. The system also facilitates more freedom with selected gas composition, e.g., permitting the use of lower cost Argon in contrast to relatively more expensive Helium. The velocity of the hot sheath gas may also be provided at a higher velocity, and thus better efficiency to confine the treated powders. Moreover, the process flexibility and variability also enables the treatment of a wide variety of materials at large scale and reduced costs.

As stated, the plasma spheroidization of the feedstock powder 104 improves the properties of the feedstock powders 104 such that the improved powder material (i.e., the treated powder 110) may be more suitable for additive manufacturing techniques. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, iron alloys, aluminum alloys, nickel alloys, chrome alloys, and nickel-based, iron-based, or cobalt-based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

As explained above, aspects of the present subject matter are directed to a system and method for processing, recycling, or otherwise treating metal powders that are typically difficult to use in additive manufacturing (AM) processes. These systems and methods are intended to transform raw or untreated powder into high quality powder that may be used for 3D printing applications. More specifically, the treated powders have restored or improved physical and chemical characteristics. For example, aspects of the present subject matter may change an irregular powder to a spherical powder to allow better flow in AM systems. The system is designed to be easily scalable and to offer more degrees of freedom between different variables, e.g., such as the type of plasma source, the type of gas, the use of electrically conductive material, no use of ceramic, efficient source of heat as gas heater, minimum cooling of the wall to enhance efficiency, etc.

According to exemplary embodiments, aspects of the present subject matter are directed toward treating metal powders, such as Titanium, TiAl, Aluminum, Iron Nickel Alloy, Stainless Steel, or any other metal alloys from raw powder that does not have the characteristics required to properly use them in the various additive manufacturing processes. Specifically, raw powders may be irregular, may exhibit poor flowability, may have unsuitable size distribution or density, and/or may have inadequate surface and bulk chemistry. Reactor assembly 108 may transform the characteristics of the powders to comply with the various AM (Electron Beam melting (EBM), Laser processes Beam machining (LBM), Laser Deposition Technology (LDT) or others). In addition, the present process for treating powders may be used to recycle powder that might otherwise be discarded.

Further aspects of the invention are provided by the subject matter of the following clauses:

1. A method of treating a feedstock powder of feedstock particles in a powder treatment assembly, the method comprising: directing the feedstock powder into a plasma chamber within a reactor of the powder treatment assembly; exposing the feedstock powder to a plasma field generated by a plasma source to form a treated powder having treated particles with an increased average sphericity relative to the feedstock particles; and supplying a hot gas sheath flow downstream of the plasma chamber, the hot gas sheath flow substantially surrounding the treated powder.

2. The method of any preceding clause, wherein the plasma source comprises a plurality of plasma torches.

3. The method of any preceding clause, wherein each of the plurality of plasma torches generate a plasma jet directed at an angle relative to a flow direction of the feedstock powder to converge at a focal point below a feedstock discharge nozzle.

4. The method of any preceding clause, further comprising: moving the feedstock discharge nozzle along a vertical direction within the plasma chamber.

5. The method of any preceding clause, further comprising: providing a flow of cooling fluid through a cooling path defined in a wall of the feedstock discharge nozzle for regulating a temperature of the feedstock discharge nozzle.

6. The method of any preceding clause, wherein the focal point is located at a chamber inlet defined on a top of the plasma chamber.

7. The method of any preceding clause, further comprising: distributing the hot gas sheath flow within a distribution chamber defined around the plasma chamber.

8. The method of any preceding clause, wherein the hot gas sheath flow is substantially cylindrical.

9. The method of any preceding clause, wherein the plasma chamber and the distribution chamber are defined by a central body positioned within the reactor.

10. The method of any preceding clause, wherein the central body is formed from graphite.

11. The method of any preceding clause, wherein the hot gas sheath flow comprises argon.

12. The method of any preceding clause, wherein exposing the feedstock powder to the plasma field comprises: introducing the feedstock powder into the plasma field such that at least a portion a surface of the feedstock particles melts or evaporates to increase the sphericity of the feedstock particles.

13. The method of any preceding clause, wherein the feedstock particles have a maximum size of about 150 µm.

14. The method of any preceding clause, wherein the feedstock particles have an average feedstock size of about 10 µm to about 150 µm.

15. The method of any preceding clause, wherein the treated particles have an average particle size that is less than an average feedstock size of the feedstock particles.

16. The method of any preceding clause, wherein the treated particles have an average particle size that is about 10% to about 90% of the average feedstock size of the feedstock particles.

17. The method of any preceding clause, wherein the feedstock powder comprises a pure metal, an iron alloy, a titanium, an aluminum alloy, a nickel alloy, a chrome alloy, a nickel-based superalloy, an iron-based superalloy, a cobalt-based superalloy, or a mixture thereof.

18. A powder treatment assembly for treating a feedstock powder of feedstock particles, the powder treatment assembly comprising: a reactor defining a plasma chamber; a feedstock supply for providing feedstock powder and a carrier gas into the plasma chamber; a plasma source for directing a plasma field into the plasma chamber to form a treated powder having treated particles with an increased average sphericity relative to the feedstock particles; and a sheath gas source for supplying a hot gas sheath flow downstream of the plasma chamber, the hot gas sheath flow substantially surrounding the treated powder.

19. The powder treatment assembly of any preceding clause, wherein the plasma source comprises a plurality of plasma torches, each of the plurality of plasma torches generating a plasma jet directed at an angle relative to a flow direction of the feedstock powder to converge at a focal point below a feedstock discharge nozzle.

20. The powder treatment assembly of any preceding clause, further comprising: a central body positioned within the reactor, the central body defining the plasma chamber and a distribution chamber that extends around the plasma chamber for distributing the hot gas sheath flow.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of treating a feedstock powder of feedstock particles in a powder treatment assembly, the method comprising:
   directing the feedstock powder from a feedstock discharge nozzle into a plasma chamber within a reactor of the powder treatment assembly;
   exposing the feedstock powder to a plasma field generated by a plasma source within the plasma chamber to form a treated powder having treated particles with an increased sphericity relative to the feedstock particles, wherein the plasma source comprises a plurality of plasma torches; and
   supplying downstream of the plasma chamber a hot gas sheath flow that surrounds the treated powder.

2. The method of claim 1, wherein the hot gas sheath flow is discharged into a distribution chamber defined around the plasma chamber, before being supplied downstream of the plasma chamber to surround the treated powder.

3. The method of claim 1, wherein the sphericity is measured using ISO 9276-6.

4. The method of claim 3, wherein an average sphericity of the sphericity of treated powder is greater than 0.85.

5. The method of claim 1, wherein the plurality of plasma torches generates a plurality of plasma jets, respectively.

6. The method of claim 5, wherein each plasma jet of the plurality of plasma jets is directed at an angle relative to a flow direction of the feedstock powder to converge at a focal point below the feedstock discharge nozzle.

7. The method of claim 6, further comprising:
   moving the feedstock discharge nozzle along a vertical direction within the plasma chamber.

8. The method of claim 6, further comprising:
   providing a flow of cooling fluid through a cooling path defined in a wall of the feedstock discharge nozzle for regulating a temperature of the feedstock discharge nozzle.

9. The method of claim 6, wherein the focal point is located at a chamber inlet defined on a top of the plasma chamber.

10. The method of claim 1, further comprising:
    distributing the hot gas sheath flow within a distribution chamber defined around the plasma chamber.

11. The method of claim 10, wherein the hot gas sheath flow is cylindrical.

12. The method of claim 10, wherein the plasma chamber and the distribution chamber are defined by a central body positioned within the reactor.

13. The method of claim 12, wherein the central body is formed from graphite.

14. The method of claim 1, wherein the hot gas sheath flow comprises argon.

15. The method of claim 1, wherein exposing the feedstock powder to the plasma field comprises:
    introducing the feedstock powder into the plasma field such that at least a portion a surface of the feedstock particles melts or evaporates to increase the sphericity of the feedstock particles.

16. The method of claim 1, wherein the feedstock particles have a maximum size of about 150 µm.

17. The method of claim 16, wherein the feedstock particles have an average feedstock size of about 10 µm to about 150 µm.

18. The method of claim 17, wherein the treated particles have an average particle size that is less than an average feedstock size of the feedstock particles.

19. The method of claim 17, wherein the treated particles have an average particle size that is about 10% to about 90% of the average feedstock size of the feedstock particles.

20. The method of claim 1, wherein the feedstock powder comprises a pure metal, an iron alloy, a titanium, an aluminum alloy, a nickel alloy, a chrome alloy, a nickel-based superalloy, an iron-based superalloy, a cobalt-based superalloy, or a mixture thereof.

* * * * *

UNITED STATES PATENT AND TRADEMARK OFFICE
CERTIFICATE OF CORRECTION

PATENT NO. : 11,654,483 B2  
APPLICATION NO. : 16/842159  
DATED : May 23, 2023  
INVENTOR(S) : Frederic Larouche et al.

Page 1 of 1

It is certified that error appears in the above-identified patent and that said Letters Patent is hereby corrected as shown below:

On the Title Page

Item (73) reads "General Electric Company, Schenectady, NY (US)" should read "AP&C Advanced Powders & Coatings Inc., Boisbriand (CA)"

Signed and Sealed this  
Nineteenth Day of September, 2023

Katherine Kelly Vidal  
*Director of the United States Patent and Trademark Office*